United States Patent [19]

Nakagawa et al.

[11] 4,007,637
[45] Feb. 15, 1977

[54] DISPOSABLE-TYPE TEMPERATURE RECORDER

[76] Inventors: George Nakagawa; Robert M. Nakagawa, both of 1812 Dakota Ave., Modesto, Calif. 95351

[22] Filed: Mar. 11, 1976

[21] Appl. No.: 666,043

[52] U.S. Cl. .............................................. 73/343.5
[51] Int. Cl.² ........................................ G01K 5/70
[58] Field of Search .................... 73/343.5, 431; 346/33 TP, 41, 136

[56] References Cited

UNITED STATES PATENTS

| 3,826,140 | 7/1974 | Nakagawa | 73/343.5 |
| 3,971,035 | 7/1976 | Maxwell | 73/343.5 |

*Primary Examiner*—S. Clement Swisher
*Attorney, Agent, or Firm*—Roger B. Webster

[57] ABSTRACT

A temperature recorder which produces a continuous graphic record, scribed on a removable tape, of the temperature existing in an enclosure (such as a refrigerated railroad car) during a given period of time (e.g., the transit time of such a railroad car). The present temperature recorder—which is a modification, in disposable form, of the recorder for like purpose shown in U.S. Pat. No. 3,826,140, dated July 30, 1974—comprises, in a sealed case, a slow travelling tape which spans between a tape feed spool an a spring-driven tape take-up spool; there being a temperature-responsive device which scribes—in terms of temperature in relation to time—on the tape as it so travels, and means to regulate the speed of travel of said tape.

7 Claims, 6 Drawing Figures

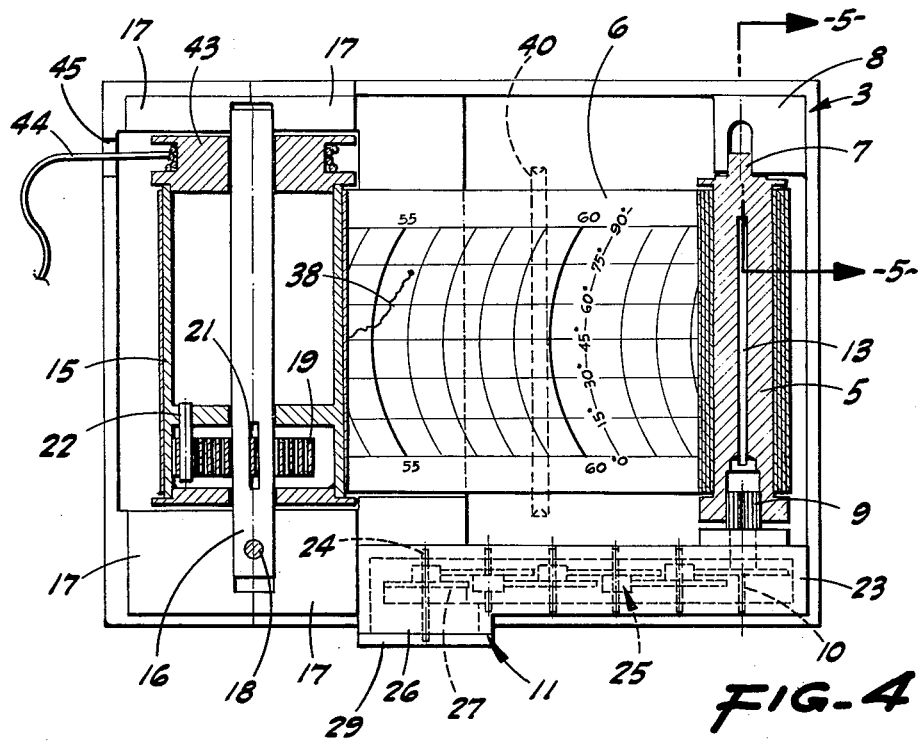
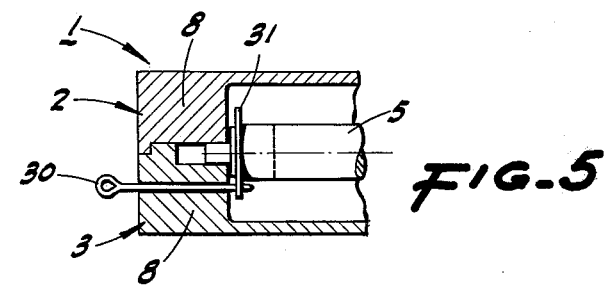
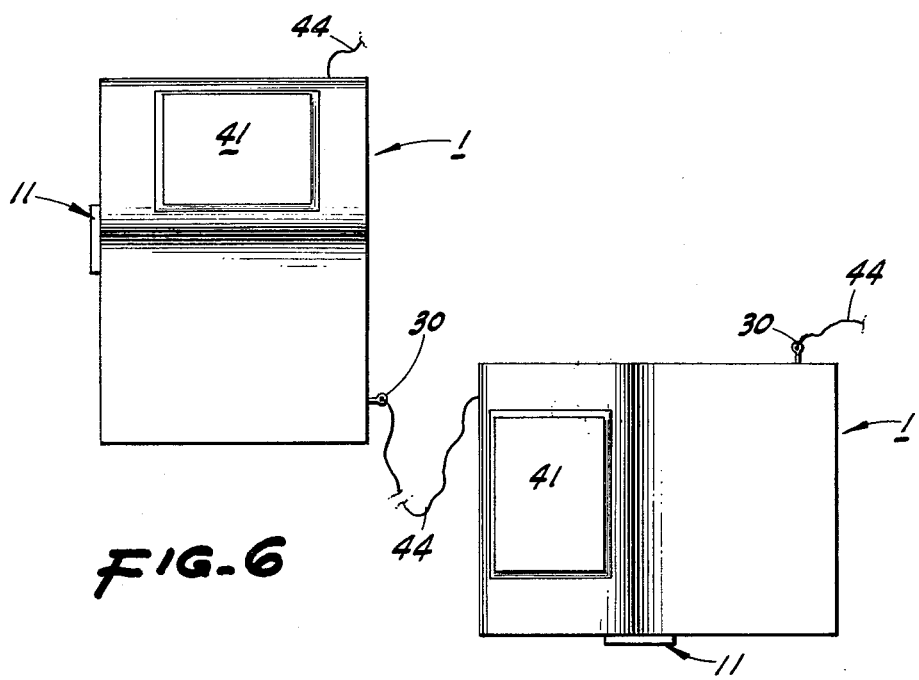

4,007,637

DISPOSABLE-TYPE TEMPERATURE RECORDER

BACKGROUND OF THE INVENTION

While the temperature recorder shown in U.S. Pat. No. 3,826,140 is extremely useful and effective, there are certain adaptations or locales of use where a less expensive and disposable temperature recorder is desired. The present invention was conceived by us in a successful effort to produce such a disposable temperature recorder.

SUMMARY OF THE INVENTION

The present invention provides, as an important object, a temperature recorder—for the purpose described—which is simple in structure, easy and inexpensive to manufacture, and hence economically disposable after use.

The present invention provides, as another important object, a disposable-type temperature recorder which includes—in a sealed plastic case—a slow-travelling tape which spans between a feed spool and a spring-driven take-up spool; there being a temperature-responsive device which scribes—in terms of temperature in relation to time—on the tape as it so travels, and means to regulate the speed of travel of such tape.

The present invention provides, as a still further object, a practical and reliable disposable-type temperature recorder, and one which is exceedingly effective for the purpose for which it is designed.

BRIEF DESCRIPTION OF THE DRAWINGS

FIG. 4 is a sectional plan view taken substantially on line 4—4 of FIG. 2.

FIG. 5 is a fragmentary sectional elevation taken substantially on line 5—5 of FIG. 4.

FIG. 6 is a diagrammatic view showing two temperature recorders interconnected for sequential operation.

DESCRIPTION OF THE PREFERRED EMBODIMENT

Figure 1:
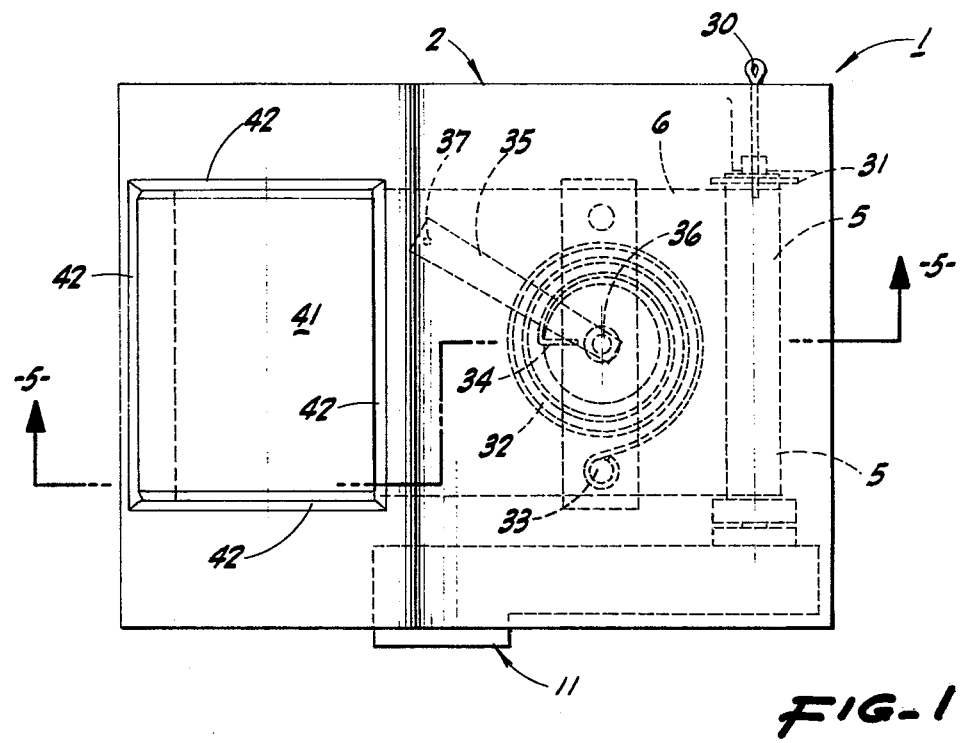
FIG. 1 is a top plan view of the present, disposable-type temperature recorder.
Figure 2:
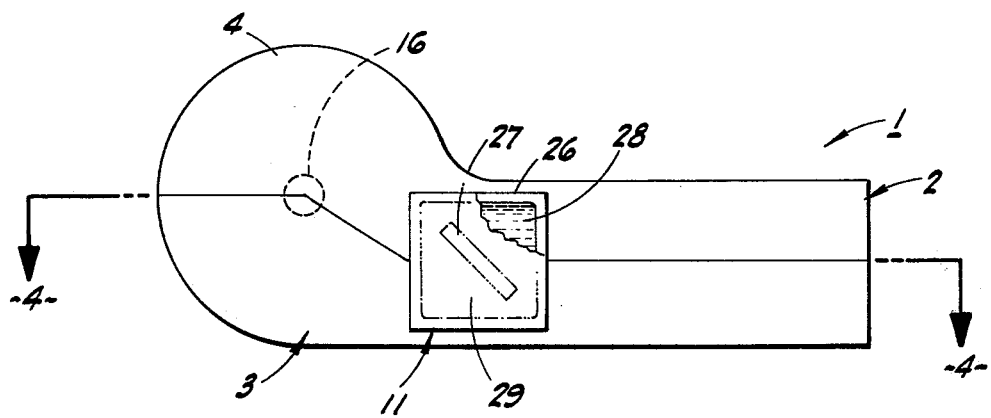
FIG. 2 is a side elevation, partly broken away, of said temperature recorder.
Figure 3:
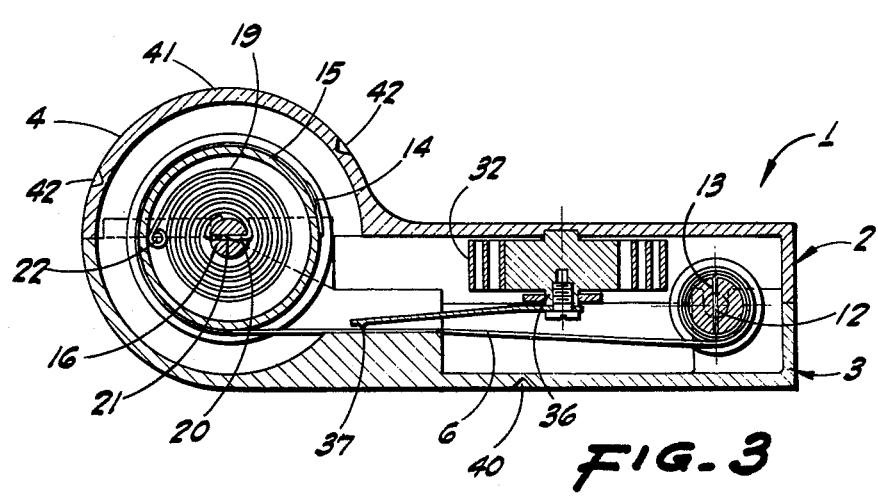
FIG. 3 is a sectional elevation taken substantially on line 3—3 of FIG. 1.

Referring now more particularly to the drawings and to the characters of reference marked thereon, the disposable-type temperature recorder of the present invention comprises a relatively small, hollow, plastic case indicated generally at 1; such case—which is rectangular in plan—including an upper half or section 2 and a lower half or section 3, and such sections being permanently sealed together—at their meeting lines—after installation in the case of the hereinafter described working parts of the recorder. The case 1 is relatively shallow except at one end which is in the form of an enlarged, transverse axis, cylindrical portion 4.

At the end remote from cylinder 4, the case is fitted therein—in rotary relation—with a feed spool 5 wound with a roll of tape 6. At one end, the feed spool 5 includes a trunnion 7 journaled in the case as at 8, while at the other end the feed spool is coupled, by a spline coupling 9, with the input shaft 10 of a tape speed control unit or governor indicated generally at 11.

The inner end tongue 12 of the tape 6, as rolled on the feed spool 5, extends through a receiving slot 13 in such spool and normally prevents relative rotation between the feed spool 5 and the tape roll; such tongue 12, however, escaping the feed spool when the tape 6 is fully unwound therefrom.

From the bottom of the feed spool 5, the tape 6 extends to the opposite end of the case, and the outer or lead end tongue 14 of such tape is attached to a relatively large diameter, hollow take-up spool 15 journaled on a fixed cross shaft 16 mounted in integral blocks 17 in the case and anchored against rotation by a cross pin 18.

The tape take-up spool 15 is rotated by motor means comprising an initially wound or loaded, clock-type coil spring 19 which surrounds the fixed cross shaft 16 within the confines of said spool 15; the inner end tongue 20 of the spring 19 being secured in a slot 21 in the cross shaft 16, while the outer end of said spring is anchored to a pin 22 fixed in spool 15. With the above arrangement, the spring 19 tends at all times to rotate the spool 15 in a direction to pull on the tape 6 and wind the same onto said spool.

The speed at which the tape travels from feed spool 5 to take-up spool 15 is extremely slow; this being by reason of the connection (by spline coupling 9) of spool 5 with the input shaft 10 of the speed-controlling unit or governor 11—the latter being constructed and functioning as follows:

A sealed, elongated housing 23 is disposed in a fixed position in, and along one side of, the case 1 in clearance relation to the tape 6 spanning between the spools 5 and 15. Between the input shaft 10 in one end of housing 23 and on output shaft 24 in the opposite end of said housing, there is a multiple gear, speed-reducing, gear train, indicated generally at 25. In addition to enclosing the gear train 25, the housing 23—in an enlarged end portion 26 thereof and on the output shaft 24—is fitted with a paddle wheel 27. The entire housing is filled with a viscous liquid 28, so that both the gear train 25 and the paddle wheel run in said viscous liquid 28. The paddle wheel 27—running in the viscous liquid—has the effect of damping or further reducing the speed of the output shaft 24 of the speed-reducing gear train 25. This paddle wheel arrangement also assures of a speed control which is constant and not subject to any major speed changes.

Thus, as the feed spool 5 can only be turned (by tape motion caused by driven, tape take-up spool 15) at extremely low speed, the tape 6 will—over a period of up to two weeks after starting operation of the recorder—slowly travel or progress between the feed spool 5 and take-up spool 15.

As shown, the enlarged end portion 26 of housing 23 opens through the side of case 1 and is provided with an outside window 29 through which the paddle wheel 27 can be observed to determine that it is functioning.

Movement of the tape (i.e., starting of operation of the temperature recorder) is initially—or until ready for use—prevented by a transverse pull pin 30 which extends through the case 1 into a receiving hole in the adjacent end flange 31 of feed spool 5.

A coil-type temperature-responsive device is mounted in the upper section of the case and comprises a thermometer coil 32—of bi-metallic helical form —having one end anchored, as at 33, to said section of the case, and the other end 34 attached to a pivotally mounted stylus 35 which overhangs the tape 6 lengthwise thereof. The pivot of stylus 35 is indicated at 36.

The stylus 35 has a scribing point 37 which rides, and produces a scribed line 38, on the tape; the latter being pressure sensitive with respect to creation of such scribed line. Thus, with temperature variations, the thermometer coil expands or contracts and causes the stylus to swing about its pivot, with the scribing point 37 producing a scribed line 38 (evidencing temperature in relation to time) on said tape. The tape—as shown—is printed with arcuate transverse lines marked in terms of temperature, while along the side the tape is marked in terms of time, i.e. elapsed time.

The lower section 3 of the case is formed—below the tape—with a bed 39 which backs and stabilizes the tape in the working zone of said scribing point.

In use, the above-described temperature recorder is mounted—in any suitable fashion—in the enclosure (such as a refrigerated railroad car) in which the temperature is to be continually recorded over a period of days; the pin 30 then being pulled, whereupon the tape starts, and continues, to travel at an extremely low, predetermined, and controlled speed between the feed spool 5 and the take-up spool 15. As the tape so travels between such spools, the temperature, as represented by the line 38, is scribed on the tape by the scribing point 37 carried by the stylus 35, with the latter being moved to and fro under the influence of the thermometer coil 32.

When the enclosure (such as a refrigerated railroad car) is opened at the termination of the period of use of the temperature recorder, the scribed tape is manually removed and the recorder then discarded; the tape being removed in the following described manner:

The lower section 3 of the plastic case 1 is formed on the underside with an outwardly opening, transverse groove 40 of a depth to form a thin membrane at the bottom of the groove. A sharp knife is used to readily cut away such membrane, whereupon the knife is projected into the case and employed to sever the tape 6; the final scribed portion of the tape then winding onto the take-up spool 15.

Nextly, a rectangular, arcuate panel 41 on the cylindrical portion 4 of the case is removed by freeing it along its margins; the margins being defined by grooves 42 of a depth which provides thin membranes and which permit of ready cutting therethrough by a sharp knife or rupturing by any suitable implement.

After the panel 41 is cut free and removed, the scribed tape 6 is grasped and drawn off the spool 15 and out of the case through the opening formed by such panel removal; the scribed tape being retained as a record, and the temperature recorder then being discarded.

Under certain conditions a taped temperature record, in a refrigerated enclosure, may be required over a period of days longer than the running time of a single temperature recorder. In such a case two (or more) temperature recorders are mounted in the enclosure, and provision is made for the recorders to function in sequence—each, at the end of its running time, causing a next recorder to start functioning. This is accomplished as follows:

The take-up spool 15 of each recorder is provided, at one end, with a pulley 43 having a flexible cord 44 attached thereto; the cord—which is of substantial length—extending out of the case 1 through a port 45. As shown in FIG. 6, the outer end of the cord 44 is connected to the pull pin 30 of the next-to-function recorder; the recorders being fixed in such relative angular positions that—when the cord 44 is wound on pulley 43 until it is drawn taut—the pull pin 30 of said next recorder is withdrawn, and the latter begins to function.

The cord 44 must, of course, be of sufficient length tp permit the tape 6 of the first recorder to escape feed spool 5 and fully wind onto the take-up spool 15; there then being enough energy or motive power remaining in spring 19 to continue to rotate said spool 15 whereby to wind the cord 44 on pulley 43 until such cord is pulled taut and withdraws the pull pin 30 of the next recorder.

From the foregoing description, it will be readily seen that there has been produced such a disposable-type temperature recorder as substantially fulfills the objects of the invention, as set forth herein.

While this specification sets forth in detail the present and preferred construction of the disposable-type temperature recorder, still in practice such deviations from such detail may be resorted to as do not form a departure from the spirit of the invention as defined by the appended claims.

We claim:

1. A temperature recorder comprising a case, a feed spool and a take-up spool rotatably mounted in the case in spaced, parallel relation, a tape wound on the feed spool and extending therefrom to connection with the take-up spool, motor means connected to the take-up spool and acting to rotate the same in a direction to cause the tape to travel from the feed spool and wind onto said take-up spool, a temperature-responsive device mounted in the case and including a movable stylus having means to scribe on the tape at a point between the spools, a speed-control device arranged in connection with at least one of the spools and operative to govern the speed of travel of the tape between said spools, and releasable means initially preventing rotation of said spools; the take-up spool being of greater diameter than the feed spool, and the case being formed with a cylindrical portion which surrounds the take-up spool in concentric relation.

2. A temperature recorder comprising a case, a feed spool and a take-up spool rotatably mounted in the case in spaced, parallel relation, a tape wound on the feed spool and extending therefrom to connection with the take-up spool, motor means connected to the take-up spool and acting to rotate the same in a direction to cause the tape to travel from the feed spool and wind onto said take-up spool, a temperature-responsive device mounted in the case and including a movable stylus having means to scribe on the tape at a point between the spools, a speed-control device arranged in connection with at least one of the spools and operative to govern the speed of travel of the tape between said spools, and releasable means initially preventing rotation of said spools; the take-up spool being hollow and rotatably surrounding a fixed center shaft in concentric relation, and the motor means comprising a wound, coil spring disposed wthin the take-up spool, one end of the spring being secured to the take-up spool and the other end anchored on the fixed shaft.

3. A temperature recorder comprising a case, a feed spool and a take-up spool rotatably mounted in the case in spaced, parallel relation, a tape wound on the feed spool and extending therefrom to connection with the take-up spool, motor means connected to the take-up spool and acting to rotate the same in a direction to cause the tape to travel from the feed spool and wind onto said take-up spool, a temperature-responsive device mounted in the case and including a movable stylus having means to scribe on the tape at a point between the spools, a speed-control device arranged in connection with at least one of the spools and operative to govern the speed of travel of the tape between said spools, and releasable means initially preventing rotation of said spools; said releasable means comprising a pull pin extending from exteriorly of the case through the same and thence into a part of one of the spools in rotation-preventing relation thereto.

4. A temperature-responsive device, as in claim 3, including a pulley at one end of the take-up spool and rotatable therewith, and a cord connected to and adapted to wind onto the pulley upon rotation thereof; the cord extending from the pulley and out of the case a certain length for connection in initially loose-play relation with the pull pin of another and adjacently mounted temperature recorder, and said length of said cord being such that—with continued rotation of the take-up spool and pulley after the tape escapes the feed spool—the cord becomes taut and pulls the pin of said other temperature recorder.

5. A temperature recorder comprising a case, a feed spool and a take-up spool rotatably mounted in the case in spaced, parallel relation, a tape wound on the feed spool and extending therefrom to connection with the take-up spool, motor means connected to the take-up spool and acting to rotate the same in a direction to cause the tape to travel from the feed spool and wind onto said take-up spool, a temperature-responsive device mounted in the case and including a movable stylus having means to scribe on the tape at a point between the spools, a speed-control device arranged in connection with at least one of the spools and operative to govern the speed of travel of the tape between said spools, and releasable means initially preventing rotation of said spools; there being a break-away panel in the case overlying the take-up spool, and the tape—upon removal of said panel—being manually accessible for removal from the take-up spool.

6. A temperature recorder, as in claim 5, in which the panel is margined by grooves in the case which define, in the bottom of said grooves, thin and readily ruptured membranes.

7. A temperature recorder, as in claim 5, including a groove in the case at a point between the spools and transversely of the tape; such groove defining, in the bottom thereof, a thin and readily ruptured membrane whereby a knife may be inserted into the case and sever the tape.

* * * * *